(12) United States Patent
Everitt

(10) Patent No.: US 8,264,491 B1
(45) Date of Patent: Sep. 11, 2012

(54) SYSTEM, METHOD, AND COMPUTER PROGRAM PRODUCT FOR CONTROLLING A SHADER TO GATHER STATISTICS

(75) Inventor: Cass W. Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1210 days.

(21) Appl. No.: 11/733,066

(22) Filed: Apr. 9, 2007

(51) Int. Cl.
*G06T 1/00* (2006.01)

(52) U.S. Cl. ........................................................ 345/522

(58) Field of Classification Search ................... 345/522
See application file for complete search history.

(56) References Cited

U.S. PATENT DOCUMENTS

| 5,537,541 | A | * | 7/1996 | Wibecan | 714/45 |
| 5,835,705 | A | * | 11/1998 | Larsen et al. | 714/47 |
| 6,067,643 | A | * | 5/2000 | Omtzigt | 714/47 |
| 2006/0092165 | A1 | * | 5/2006 | Abdalla et al. | 345/545 |
| 2007/0139421 | A1 | * | 6/2007 | Chen et al. | 345/501 |

* cited by examiner

*Primary Examiner* — Edward Martello
(74) *Attorney, Agent, or Firm* — Zilka-Kotab, PC

(57) ABSTRACT

A system, method, and computer program product are provided for controlling a shader to gather statistics. In use, instructions are received utilizing a programmable interface. A shader is then controlled to gather statistics based on the instructions. Such statistics are further output to memory utilizing the shader.

22 Claims, 4 Drawing Sheets

SYSTEM, METHOD, AND COMPUTER PROGRAM PRODUCT FOR CONTROLLING A SHADER TO GATHER STATISTICS

FIELD OF THE INVENTION

The present invention relates to shaders, and more particularly to gathering statistics utilizing a shader.

BACKGROUND

Shaders are components in graphics processors which perform a variety of tasks related to various aspects (e.g. vertices, geometry, pixels, etc.) of the rendering process. Shaders typically operate under the control of shader programs that are written to address a large amount of data (e.g. each pixel in an area of a screen, every vertex of a model, etc.). Further, the foregoing processing typically has few interdependencies. Thus, shaders typically rely heavily on parallel processing, whereby a plurality of threads is executed in parallel.

While such parallel processing is ideal when addressing the foregoing types of graphics processing, it is less effective in gathering statistics. In particular, each of the aforementioned threads typically complete any and all associated processing before a large amount of related data is subsequently written to memory. Further, before such data can be used to gather statistics, etc., prior art systems conventionally require an additional reduction pass to prepare the data for such purpose.

The requirement of such additional pass typically results in less efficiency and additional expense. For example, the amount of data that is subjected to the additional pass may be quite voluminous. This, in turn, requires additional storage and processing resources.

There is thus a need for addressing these and/or other issues associated with the prior art.

SUMMARY

A system, method, and computer program product are provided for controlling a shader to gather statistics. In use, instructions are received utilizing a programmable interface. A shader is then controlled to gather statistics based on the instructions. Such statistics are further output to memory utilizing the shader.

DETAILED DESCRIPTION

Figure 1:
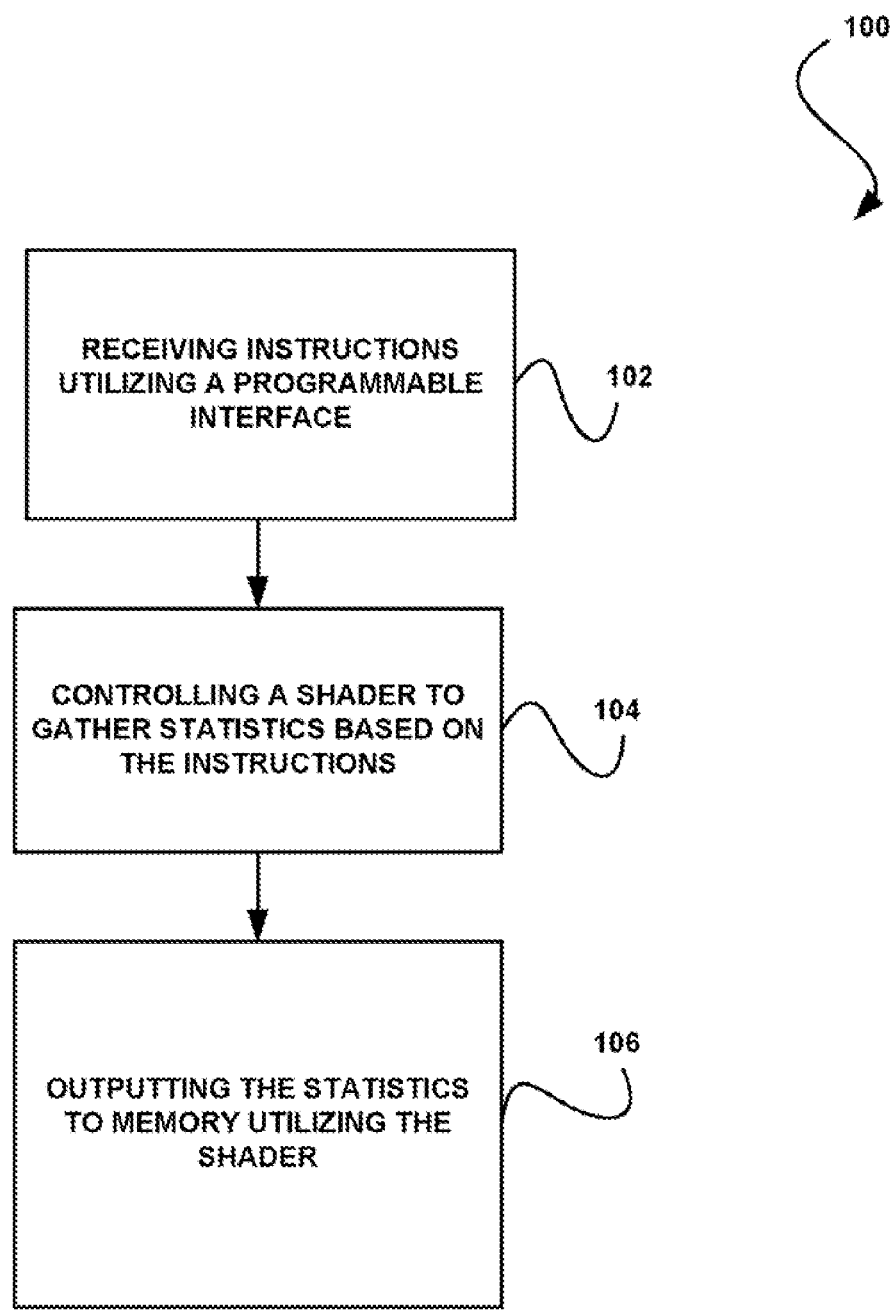
FIG. 1 shows a method for controlling a shader to gather statistics, in accordance with one embodiment.

FIG. 1 shows a method 100 for controlling a shader to gather statistics, in accordance with one embodiment. As shown, instructions are received utilizing a programmable interface. See operation 102. In the context of the present description, such instructions may refer to any command, code, etc. that results in a shader gathering statistics, as will soon become apparent.

In one possible deterministic embodiment, the instructions may be order-independent. For example, the instructions may each relate to statistics-gathering tasks which would render the same result, regardless as to which order they were executed. In various embodiments, such instructions may include, but are not limited to a clamping unsigned integer addition instruction, a wrapping signed integer addition instruction, etc. In another embodiment, floating point operations may be avoided to support the aforementioned order-independence.

In additional embodiments, a plurality of such statistics gathering-related instructions may be received in combination with shader instructions that are capable of controlling the shader to perform a variety of tasks related to various aspects (e.g. vertices, geometry, pixels, etc.) of rendering. Together, such statistics-gathering/shader instructions may, in one embodiment, take the form of a shader program capable of operating in conjunction with an application program interface (API). Non-limiting examples of APIs may include the OPENGL API, DIRECTX API, open or proprietary extensions thereof, etc.

In operation 104, a shader is controlled to gather statistics based on the instructions. In the present description, the foregoing shader may include, but is certainly not limited to a geometry shader, a vertex shader, a fragment shader, a pixel shader, a unified shader, and/or any other shader, for that matter.

It should be noted that the statistics may relate to absolutely any facet of the shader and/or a corresponding processor (e.g. graphics processor, etc.), the data that is subject to any processing, etc. For instance, in one embodiment, the statistics may relate to the results of shader operation. Just by way of example, the statistics may include, in various embodiments, a number of shader invocations, primitives, vertices, total samples, samples that pass/fail a predetermined test (e.g. z-value/stencil test, etc.), etc.

With continuing reference to FIG. 1, such statistics are output to memory utilizing the shader. See operation 106. In one embodiment, such memory may reside on a first integrated circuit separate from a second integrated circuit on which the shader resides. Of course, embodiments are contemplated where the memory resides on an integrated circuit on which the shader resides.

In one possible embodiment, the statistics may therefore be gathered and used "on-the-fly" without necessarily requiring an additional processing pass utilizing the shader. Further, in various embodiments, the statistics may be used in the context of any desired application. Just by way of example, the statistics may be employed in the context of megatexturing, tone mapping, etc.

More illustrative information will now be set forth regarding various optional architectures and features with which the foregoing framework may or may not be implemented, per the desires of the user. Thus, it should be strongly noted that the following information is set forth for illustrative purposes and should not be construed as limiting in any manner. Any of the following features may be optionally incorporated with or without the exclusion of other features described.

Figure 2:
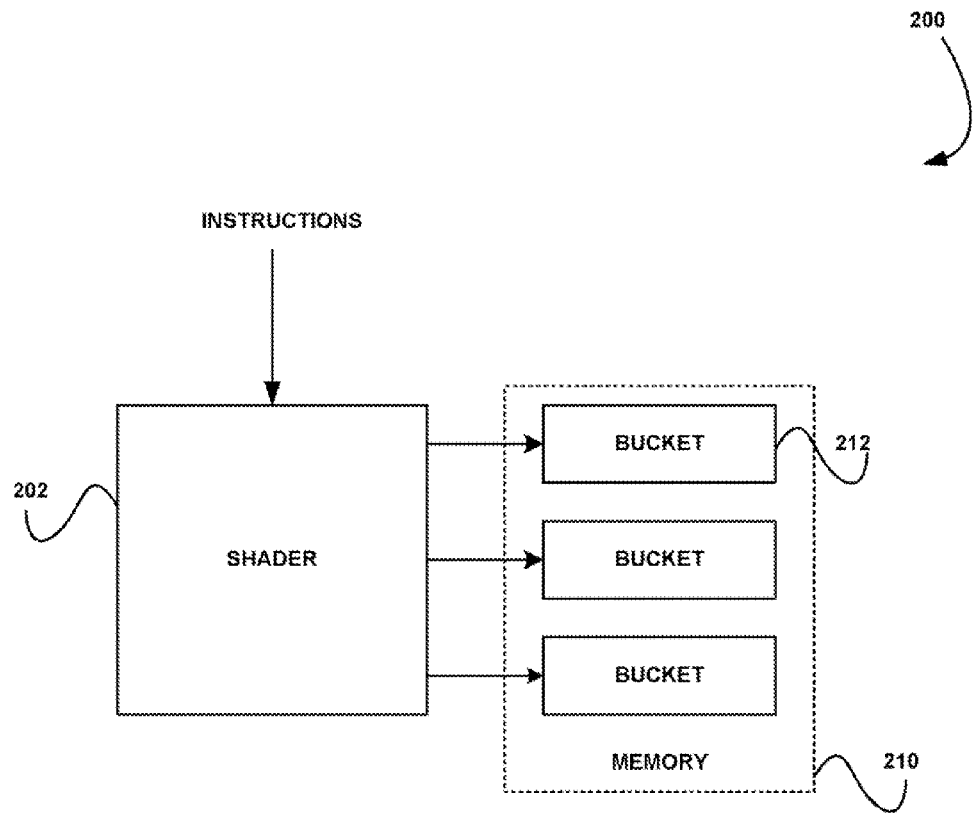
FIG. 2 shows a system for controlling a shader to gather statistics, in accordance with another embodiment.

FIG. 2 shows a system 200 for controlling a shader to gather statistics, in accordance with another embodiment. As an option, the system 200 may be used to carry out the method 100 of FIG. 1. Of course, however, the system 200 may be implemented in any desired environment. Further, the previously mentioned definitions equally apply to the description of the present embodiment.

As shown, a shader 202 is included which is capable of receiving instructions. As mentioned earlier, such instructions may include statistics gathering-related instructions as well as shader instructions. In one embodiment, the shader 202 may be one of many shaders that correlate with hardware architectures of an associated processor. Exemplary processors will be set forth in greater detail during reference to FIG. 4.

Further provided is memory 210 including a plurality of buckets 212. Such buckets 212 may take the form of a register, buffer, and/or any other type of physical unit of memory. While the memory 210 is shown to be separate from the shader 202 in the present embodiment, it should be noted that other embodiments are contemplated where the memory 210 and the shader 202 are integrated. While not shown, each of the buckets 212 may each include a unique address for allowing the shader 202 to write data thereto.

In use, the shader 202 is not only capable of performing a variety of rendering tasks related to various rendering aspects (e.g. vertices, geometry, pixels, etc.), but also gathering statistics. Specifically, in response to receiving a statistics gathering-related instruction, the shader 202 is capable of executing the instruction for the purpose of gathering and writing any requested statistics to one of the buckets 212.

Table #1 illustrates one exemplary data structure for a possible programmable instruction.

TABLE #1

COMMAND, DESTINATION

In such embodiment, the command may refer to the operation (e.g. addition, clamp, etc.) and the destination may refer to a destination (e.g. one of the buckets 212, etc.). As an option, the destination may refer to a logical location and a driver or the like may translate such location to a physical location. One specific example of a possible command may include a GRED operation. Of course, other data structures with more or less components are contemplated. As an option, a type of operation (e.g. unsigned add, etc) may be associated with a memory buffer being written. For example, if it is not safe to allow both clamped unsigned addition and wrapping signed addition operation to be applied to the same memory location, a graphics API may make this a property of the buffer rather than part of the instruction word, regardless of how the hardware actually implemented it, etc.

In terms of one example of use (in the case of an addition command), the related instruction may simply increment a running tally in a designated one of the buckets 212. Such increment may be a function of something taking place in the shader 202 (e.g. passing of a test, a fragment exhibiting a particular value, etc.). In another histogram-related example, a first designated bucket 212 may be incremented if a value is above a predetermined threshold, a second designated bucket 212 may be incremented if a value is below the predetermined threshold, etc.

Such statistical data is thus immediately available for gathering related statistics. In one embodiment, the data itself may include statistics in one form or another (without necessarily requiring further statistics-related processing, etc.). In another optional embodiment, the statistics may be made available (e.g. by a read operation, etc.) contingent on the fact that no thread is currently writing to the associated bucket 212. More information regarding the operation of the shader 202 in the context of another embodiment (as well as various possible applications) will now be set forth during reference to FIG. 3.

Figure 3:
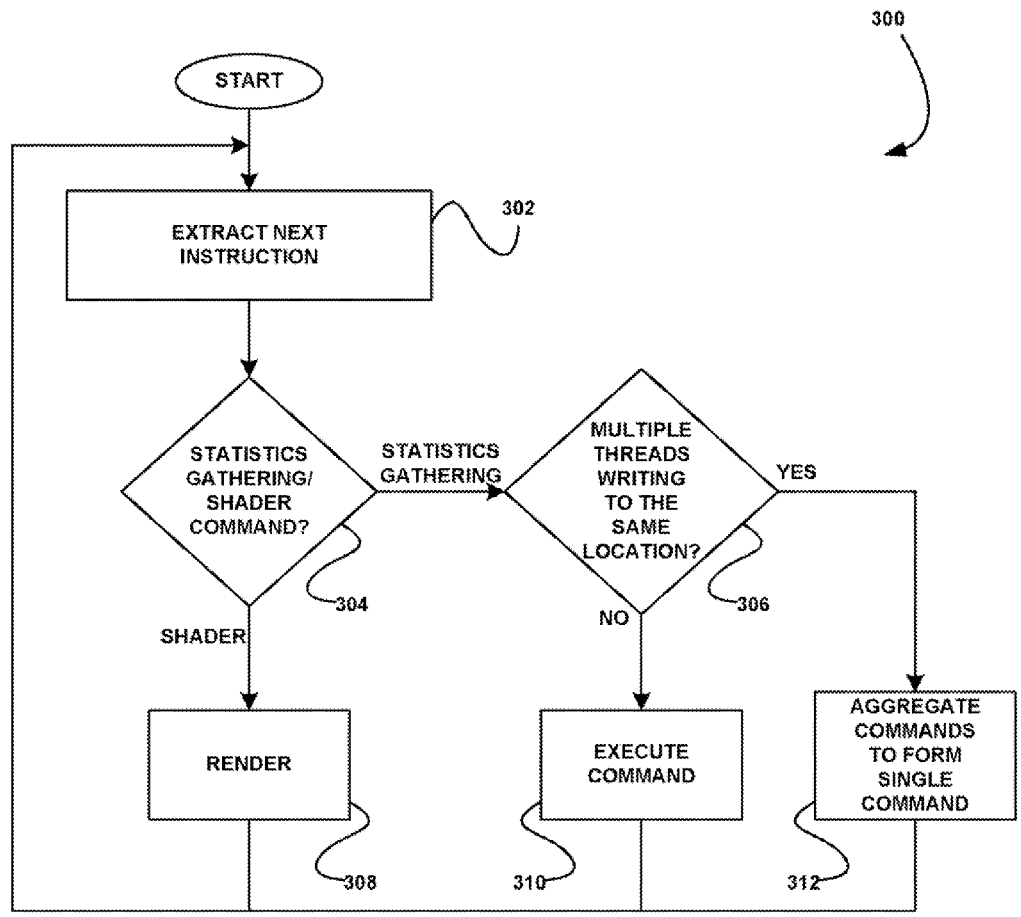
FIG. 3 shows a method for controlling a shader to gather statistics, in accordance with another embodiment.

FIG. 3 shows a method 300 for controlling a shader to gather statistics, in accordance with another embodiment. As an option, the method 300 may be carried out in the context of the system 200 of FIG. 2. Of course, however, the method 300 may be carried out in the context of any desired environment. Again, the previously mentioned definitions equally apply to the description of the present embodiment.

It should be noted that the method 300 represents a single thread of operation. Of course, multiple instances of the method 300 may be carried out in parallel.

As shown, an instruction is extracted in operation 302. In one embodiment, such instruction may be extracted from a shader program utilizing an associated API. Again, such instructions may include statistics gathering-related instructions as well as shader instructions. Further, such different instructions may be intermixed, and may be extracted sequentially one-by-one in the order provided.

Upon extraction, it may be determined whether the instruction extracted in operation 302 is a statistics gathering-related instruction or a shader instruction. See decision 304. This may be accomplished by inspecting a tag, flag, etc. of the instruction, or utilizing any technique, for that matter. In another embodiment, such decision 304 may be omitted, whereby the difference between the instructions is transparent to the shader, etc. In any case, the shader may or may not necessarily understand the meaning of the statistics, which may be gathered in a manner configured by a developer, etc. using the API.

If it is determined in decision 304 that the current extracted instruction is a shader instruction, such instruction may be executed for rendering purposes. See operation 308. As mentioned earlier, such shader instructions are capable of controlling the shader to perform a variety of tasks related to various aspects (e.g. vertices, geometry, pixels, etc.) of rendering.

On the other hand, if it is determined in decision 304 that the current extracted instruction is a statistics gathering-related instruction, it may then be determined whether multiple shader threads are attempting to write to the same location (e.g. see the buckets 212 of FIG. 2, etc.). Note decision 306. If not, the statistics gathering-related instruction may simply be executed to gather and write statistics to memory, as indicated in operation 310.

If, however, it is determined that multiple shader threads are indeed attempting to write to the same location, any instruction-related commands being executed by the different threads may be aggregated to form a single command. See operation 312. For example, if four commands attempt to concurrently increment a designated bucket by one (1), such four commands may be translated into a single command that increments the designated bucket by four (4).

In other embodiments, such aggregation need not necessarily be reserved for concurrent writes. For instance, even commands (like the four mentioned above) which are executed at different times may be delayed and/or cached for the purpose of aggregating with earlier/later similar commands. To this end, a single command may be used to write to memory after/at a predetermined time.

Thus, upon identifying a plurality of commands for outputting the statistics to the same location in the memory, the commands may be aggregated, resulting in a single command for outputting the statistics to the same location in the memory. To this end, the statistics are gathered in parallel with an execution of shader instructions, and situations where multiple threads are attempting writes to the same memory are properly managed.

In various embodiments, the aforementioned statistics may be utilized for any desired purpose and in the context of any application. Just by way of example, the statistics may be utilized in conjunction with megatexturing. During megatexturing, a large texture may be subdivided into tiles. Thus, during use, any appropriate tiles that will be required during rendering may be loaded. In one embodiment, any additional processing pass required for the identification of such appropriate tiles (e.g. where tile identifiers are rendered for use during a subsequent "reduction" pass, etc.) may be avoided, utilizing the aforementioned statistics. For instance, an instruction may be fed to the shader to write out an indication of a tile that was required, but not loaded. Therefore, such indications may be gleaned and used immediately to load the required tile for use when rendering a subsequent frame.

Thus, the present embodiment may keep a running tally of which tiles of a very large virtual texture are being referenced. In this case, a developer may be able to build a histogram of the tiles being touched and consult it regularly to make changes to the list of tiles actually available. A second use case involves indirect writes, since the shader does not know which tiles the shader is going to access until it computes the tile address in the shader. This is an operation that is itself data dependent. Also, for this reason, accumulation into memory may be more appropriate than a fixed set of on-chip registers.

Of course, the foregoing exemplary application is set forth for illustrative purposes only and should not be construed as limiting in any manner. For example, the statistics may be used in the context of scatter-gathering (e.g. where multiple threads are writing to the same location in a deterministic manner, etc.), tone mapping [e.g. indicating that different portions of a frame have different illumination intensities using different buckets, etc. for use in the context of high dynamic range (HDR) rendering, etc.], z-value/stencil testing (e.g. knowing the fraction of an object that is visible, etc.), etc.

Figure 4:
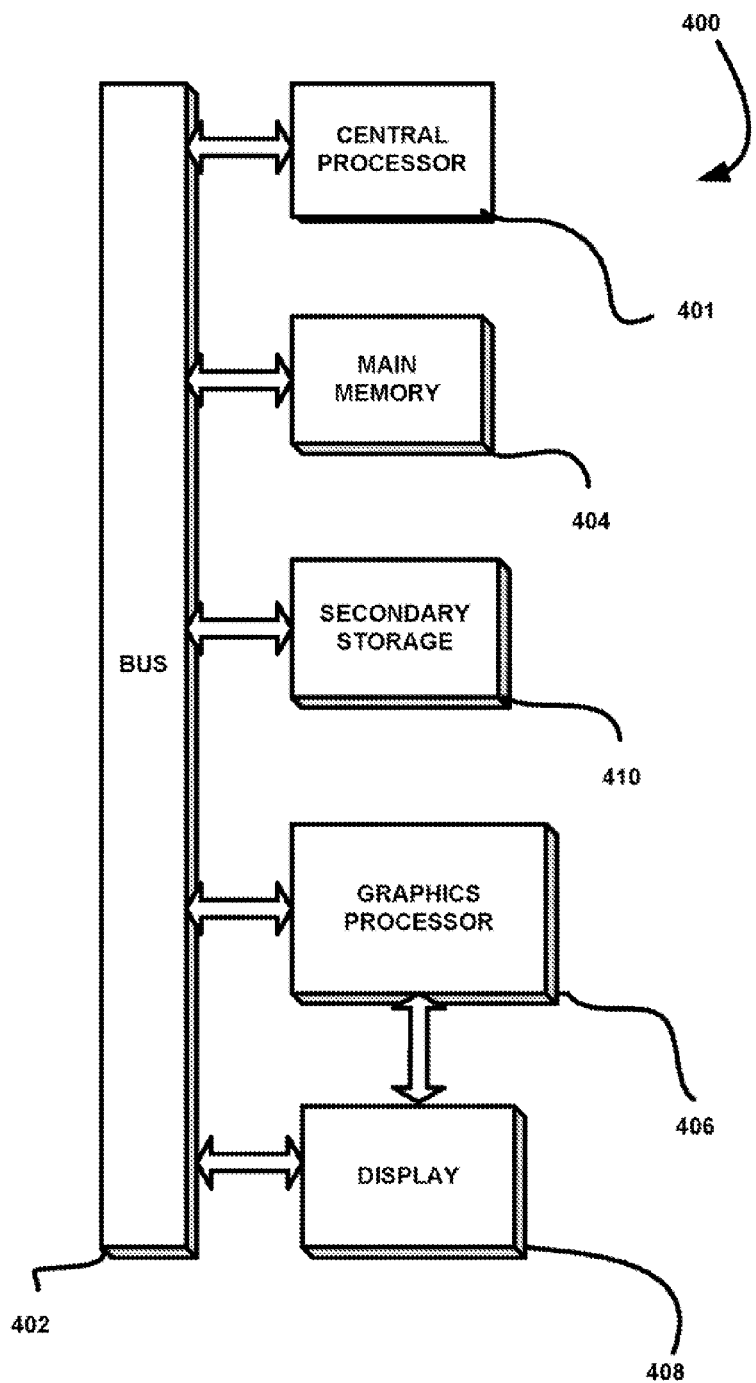
FIG. 4 illustrates an exemplary system in which the architecture and/or functionality of the various previous embodiments may be implemented.

FIG. 4 illustrates an exemplary system 400 in which the architecture and/or functionality of the various previous embodiments may be implemented. For example, the aforementioned shader (e.g. shader 202 of FIG. 2, etc.) may be implemented in any one of the various components of the system 400.

As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules (e.g. shader 202 of FIG. 2), a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving instructions utilizing a programmable interface;
   controlling a shader to gather statistics based on the instructions; and
   outputting the statistics to memory utilizing the shader;
   wherein the statistics relate to operation of the shader and include a number of primitives, a number of vertices, and a number of total samples.

2. The method of claim 1, wherein the instructions are order-independent.

3. The method of claim 1, wherein the instructions include a clamping unsigned integer addition instruction.

4. The method of claim 1, wherein the instructions include a wrapping signed integer addition instruction.

5. The method of claim 1, wherein the instructions include a clamping unsigned integer addition instruction, and a wrapping signed integer addition instruction.

6. The method of claim 1, wherein the shader includes at least one of a geometry shader, a vertex shader, a fragment shader, a pixel shader, and a unified shader.

7. The method of claim 1, wherein the statistics are gathered in parallel with an execution of shader instructions.

8. The method of claim 1, wherein a plurality of shader threads output the statistics to a same location in the memory.

9. The method of claim 1, and further comprising identifying a plurality of commands for outputting the statistics to a same location in the memory.

10. The method of claim 9, and further comprising aggregating the commands.

11. The method of claim 10, wherein the aggregating results in a single command for outputting the statistics to the same location in the memory.

12. The method of claim 1, wherein the memory resides on a first integrated circuit separate from a second integrated circuit on which the shader resides.

13. The method of claim 1, wherein the memory resides on an integrated circuit on which the shader resides.

14. The method of claim 1, wherein the statistics are utilized for megatexturing.

15. The method of claim 1, wherein the statistics are utilized for tone mapping.

16. The method of claim 1, wherein the statistics include at least one of a number of shader invocations and a number of samples that pass a predetermined test.

17. The method of claim 1, wherein the statistics relating to the operation of the shader further include a number of shader invocations, a number of samples that pass a predetermined test, and a number of samples that fail the predetermined test.

18. The method of claim 1, wherein at least one of the instructions to the shader instruct the shader to write out an indication of a tile that was required for a rendering of a frame but was not loaded, and the indication is used to load the required tile for a rendering of a subsequent frame.

19. The method of claim 1, wherein the instructions further include a related instruction that increments a running tally in a bucket included in the memory, the incrementing is a function of an operation taking place in the shader, and the operation includes at least one of a passing of a test and a fragment exhibiting a particular value.

20. A data structure embodied on a non-transitory computer readable medium, comprising:
   a programmable interface for receiving instructions capable of controlling a shader to gather statistics and output the statistics to memory;
   wherein the statistics relate to operation of the shader and include a number of primitives, a number of vertices, and a number of total samples.

21. An apparatus, comprising:
   a processor for receiving instructions capable of controlling a shader to gather statistics and output the statistics to memory;
   wherein the statistics relate to operation of the shader and include a number of primitives, a number of vertices, and a number of total samples.

22. The apparatus of claim 21, wherein the processor remains in communication with the memory and a display via a bus.

* * * * *